(12) United States Patent
Kobayashi et al.

(10) Patent No.: US 9,968,957 B2
(45) Date of Patent: May 15, 2018

(54) COATING DEVICE AND COATING METHOD

(71) Applicant: JFE STEEL CORPORATION, Tokyo (JP)

(72) Inventors: Hirokazu Kobayashi, Tokyo (JP); Masayasu Ueno, Tokyo (JP); Junichi Toriu, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days. days.

(21) Appl. No.: 14/772,702

(22) PCT Filed: Mar. 4, 2014

(86) PCT No.: PCT/JP2014/055409
§ 371 (c)(1),
(2) Date: Sep. 3, 2015

(87) PCT Pub. No.: WO2014/141939
PCT Pub. Date: Sep. 18, 2014

(65) Prior Publication Data
US 2016/0030968 A1 Feb. 4, 2016

(30) Foreign Application Priority Data

Mar. 11, 2013 (JP) .................................. 2013-048203

(51) Int. Cl.
*B05C 1/08* (2006.01)
*B05D 1/28* (2006.01)
(Continued)

(52) U.S. Cl.
CPC .............. *B05C 1/0817* (2013.01); *B05D 1/28* (2013.01); *C21D 8/1277* (2013.01);
(Continued)

(58) Field of Classification Search
CPC ..... B05C 1/0817; B05C 1/083; B05C 1/0808; B05C 1/0834; C21D 8/1288; C21D 8/1277; C25F 3/14; C25F 3/06
(Continued)

(56) References Cited

U.S. PATENT DOCUMENTS 4,198,446 A * 4/1980 Goetz ................... B05C 1/0834
118/117
4,282,275 A * 8/1981 Werner ................ B41M 5/1246
118/246
(Continued)

FOREIGN PATENT DOCUMENTS

CN         101094730 A    12/2007
CN         201807502 U    4/2011
(Continued)

OTHER PUBLICATIONS

Jun. 10, 2014 International Search Report issued in International Patent Application No. PCT/JP2014/055409.
(Continued)

*Primary Examiner* — Laura Edwards
(74) *Attorney, Agent, or Firm* — Oliff PLC

(57) ABSTRACT

A coating device includes: a first roll including a roll surface on which an application liquid is deposited; a first scratch off member configured to scratch off the application liquid from the roll surface of the first roll; a second roll including a roll surface configured to contact with the roll surface of the first roll, wherein the second roll is configured to rotate in a rotation direction opposite to a rotation direction of the first roll, the application liquid is transferred from the roll surface of the first roll to the roll surface of the second roll, and the second roll is configured to transfer the transferred applica-
(Continued)

tion liquid to a steel strip; and a second scratch off member configured to scratch off the application liquid from the roll surface of the second roll.

2 Claims, 2 Drawing Sheets

(51) Int. Cl.
*C25F 3/06* (2006.01)
*C25F 3/14* (2006.01)
*C21D 8/12* (2006.01)
*B05D 7/14* (2006.01)

(52) U.S. Cl.
CPC .............. *C21D 8/1288* (2013.01); *C25F 3/06* (2013.01); *C25F 3/14* (2013.01); *B05C 1/083* (2013.01); *B05C 1/0808* (2013.01); *B05C 1/0834* (2013.01); *B05D 7/14* (2013.01); *B05D 2202/10* (2013.01); *B05D 2252/02* (2013.01); *Y02P 10/212* (2015.11)

(58) Field of Classification Search
USPC ................. 118/259, 261, 262, 211, 212, 245

See application file for complete search history.

(56) References Cited

U.S. PATENT DOCUMENTS

| | | | | |
|---|---|---|---|---|
| 5,310,573 A | * | 5/1994 | Tanokuchi | B05C 1/0826 118/249 |
| 5,413,806 A | * | 5/1995 | Braun | B05C 1/083 118/224 |
| 5,876,530 A | * | 3/1999 | Seki | B31F 1/2818 118/258 |
| 6,673,391 B1 | * | 1/2004 | Perkett | B05C 1/0808 427/207.1 |
| 2006/0147637 A1 | | 7/2006 | Cooprider et al. | |

FOREIGN PATENT DOCUMENTS

| | | |
|---|---|---|
| CN | 202343390 U | 7/2012 |
| JP | S57-2252 B2 | 1/1982 |
| JP | H03207466 A | 9/1991 |
| JP | H06108300 A | 4/1994 |
| JP | H0724384 A | 1/1995 |
| JP | 2942074 B2 | 8/1999 |
| JP | H11279646 A | 10/1999 |
| JP | 2006263624 A | 10/2006 |

OTHER PUBLICATIONS

Nov. 17, 2015 Office Action issued in Japanese Patent Application No. 2013-048203.
Jul. 5, 2016 Office Action issued in Chinese Patent Application No. 201480013802.4.

* cited by examiner

COATING DEVICE AND COATING METHOD

FIELD

The present invention relates to a coating device and a coating method of coating a resist ink successively to a cold rolled steel strip for an electrical steel sheet to which cold rolling is applied.

BACKGROUND

Conventionally, a grain oriented electrical steel sheet has been used as iron core material for a transformer in which good magnetic properties are required. When using the grain oriented electrical steel sheet as the iron core material for the transformer, in order to reduce a loss of energy, among the magnetic properties, it is essential to reduce an iron loss.

For the purpose of reducing the iron loss, several efforts have been made including: a method of increasing an electric resistance of the steel sheet by means of increasing a silicon (Si) content, a method of precisely aligning a crystal orientation to (110) [001] orientation, and a method of making the steel sheet thinner to reduce a thickness of the steel sheet. However, a metallurgical method has itself a limit to reduce the iron loss.

Other effort to reduce the iron loss has been made including a method of refining a magnetic domain artificially. Patent Literature 1 discloses a method of refining the magnetic domain including a step of irradiating a laser onto a surface of the steel sheet on which finish annealing has been made. The method of the patent literature results in an effective reduction of the iron loss, however, it has a problem in that degradation of the iron loss is introduced because thermal strain induced by the laser refines the magnetic domain and thus strain relief annealing restores thermal strain. In a method of producing a steel sheet for a wound iron core, the strain relief annealing is essential step. Therefore, it is hard to employ the method disclosed in the Patent Literature 1 as a method of reducing an iron loss in the grain oriented electrical steel sheet.

Patent Literature 2 is known which discloses a method of producing a grain oriented electrical steel sheet including a strain relief annealing step as a technique capable of suppressing the degradation of the iron loss. The Patent Literature 2 discloses a method including steps of: coating a resist ink lineally to form a patterning; etching the steel sheet using the resultant resist pattern as a mask; and refining the magnetic domain by means of the formed linear grooves.

Generally, as a method of coating a resist ink in a linear pattern, an inkjet, a slot die coater, a gravure roll coater or the like has been utilized. When coating a base material such a steel sheet that is rigid and likely deformed, a rubber roll is suitable because the rubber roll enable itself to follow the deformation of the steel sheet due to elastic deformation.

The method of coating the resist ink using the rubber roll includes coating a resist ink on a surface of the steel sheet while pinching the steel sheet with an offset roll in which rubber is lined on a steel roll and a backup roll on which steel sheet is wound. Because the resist ink is coated on the steel sheet with being wound on the backup roll, a form of the steel sheet is corrected in a smooth form to some extent, so that the resist pattern is also smoothly coated.

CITATION LIST

Patent Literature

Patent Literature 1: Japanese Patent Kokoku-publication Showa 57-2252
Patent Literature 2: Japanese Patent No. 2942074

SUMMARY

Technical Problem

However, in the technique described in the Patent Literature 1, it has a problem in that uniform linear grooves are never formed after etching the steel sheet if the linear grooves are partially filled or discontinued at a step of coating a resist ink may occur. In this case, magnetic properties variation may occur in the produced grain oriented electrical steel sheet.

Furthermore, in the technique described in the Patent literature 1, the resist ink is scratched off by the blade applied against a roller plane of the roll on which the resist ink has been coated. The resist ink scratched off by the blade is returned into liquid reservoir such as a pan dish or the like which reserves the resist ink. However, there was a case where a part of the resist ink deposits to the steel sheet via the roll. In this way, when the resist ink, which has been scratched off, deposits to the steel sheet, a predetermined linear groove pattern is not formed on the steel sheet, thereby causing such a defect of coating.

Recent years, a reduction of a production cost is required even for relatively expensive grain oriented electrical steel sheet among thin steel sheets. High efficiency of productivity is needed by means of improving a rate of productivity. In order to achieve high rate of productivity, increasing a speed of production line (i.e., line speed) is possible. However, increasing a speed of production line causes a problem associated with the above mentioned blade as follows because it is needed to increase coating speed of a resist ink to the steel sheet, accordingly.

Namely, when increasing the line speed, an amount of reserved liquid in a reservoir in which a resist ink that has been scratched off by the blade is accumulated increase. In this way, ink through a roll deposits to a roller plane that transfers a linear groove pattern onto a steel sheet or a steel sheet. As a result, defects are formed in the transferred linear groove pattern. The defects are formed by that an amount of resist ink flowing down from an end of the roll increases as an amount of resist ink that is scratched off increases according to increasing of the line speed, and thus resist ink through a side of the roll deposits to a side of other roll or the steel sheet before the resist ink returns to the pan dish.

Furthermore, other than a resist ink that is scratched off from the end of the roll by the blade, the defects occurs by a resist ink that flows down along a roller plane as it is. Moreover, in a case that a resist ink that has flown down falls onto a surface of a steel sheet on which a resist ink is not yet coated and deposits thereto, the defects occurs, similarly. These defects make a bad effect on forming a uniform linear groove pattern on a surface of the steel sheet.

In the light of the forgoing, an object of the present invention is to provide a coating device and a coating method that can uniformly coat a coating material on a surface of a steel strip while improving productivity when coating the coating material using a roll in a predetermined pattern on the surface of the steel strip successively.

Solution to Problem

To solve the above-described problem and achieve the object, a coating device according to the present invention includes: a first roll including a roll surface on which an application liquid is deposited; a first scratch off member configured to scratch off the application liquid from the roll surface of the first roll; a second roll including a roll surface configured to contact with the roll surface of the first roll, wherein the second roll is configured to rotate in a rotation direction opposite to a rotation direction of the first roll, the application liquid is transferred from the roll surface of the first roll to the roll surface of the second roll, and the second roll is configured to transfer the transferred application liquid to a steel strip; and a second scratch off member configured to scratch off the application liquid from the roll surface of the second roll, wherein the first scratch off member is located at an uppermost part of the first roll or located between more upstream side than the uppermost part along the rotation direction of the first roll and more upstream side than a position where the first roll contacts with the second roll along the rotation direction of the first roll, and the second scratch off member is located at an uppermost part of the second roll or located between more downstream side than the uppermost part along the rotation direction of the second roll and more upstream side than a position where the second roll contacts with the first roll along the rotation direction of the second roll.

Moreover, in the above-described coating device according to the present invention, a part of the steel strip, which is upstream side from a position where the first roll applies the application liquid to the steel strip along a direction that the steel strip proceed, passes not below the first roll in a gravity direction, and a part of the steel strip separated from the second roll, which is downstream side along the direction that the steel strip proceeds, is inclined at an angle of −20° to 20° relative to a direction perpendicular to the gravity direction.

Moreover, the above-described coating device according to the present invention further includes a third roll configured to partially wind the steel strip, cooperate with the second roll to pinch the steel strip, and rotate in a rotation direction opposite to the rotation direction of the second roll.

Moreover, in the above-described coating device according to the present invention, a part of the steel strip, which is upstream side from a position where the second roll applies the application liquid to the steel strip along a direction that the steel strip proceed, passes not below the second roll in a gravity direction, and a part of the steel strip separated from the third roll, which is downstream side along the direction that the steel strip proceeds, is inclined at an angle of −20° to 20° relative to a direction perpendicular to the gravity direction.

Moreover, in the above-described coating device according to the present invention, a controller controls a proceeding speed of the steel strip to be not less than 30 m/min.

Moreover, in the above-described coating device according to the present invention, the steel strip is a cold rolled steel strip for an electrical steel sheet.

Moreover, a method of coating according to the present invention includes: a depositing step of depositing an application liquid on a roll surface of a first roll; a first scratching off step of scratching off, by a first scratch off member, the application liquid from the roll surface of the first roll at a position located at an uppermost part of the first roll or at a position located between more upstream side than the uppermost part along the rotation direction of the first roll and more upstream side than a position where the first roll contacts with the second roll along the rotation direction of the first roll; a transferring step of transferring the application liquid to a roll surface of the second roll by causing the roll surface of the first roll to contact with the roll surface of the second roll that rotates in a rotation direction opposite to the rotation direction of the first roll; a second scratching off step of scratching off, by a second scratch off member, the application liquid from the roll surface of the second roll at a position located at an uppermost part of the second roll or at a position located between more downstream side than the uppermost part along the rotation direction of the second roll and more upstream side than a position where the second roll contacts with the first roll along the rotation direction of the second roll; and a coating step of coating the application liquid to the steel strip that is partially wound around a third roll, wherein the third roll cooperates with the second roll to pinch the steel strip, and rotates in a rotation direction opposite to the rotation direction of the second roll.

Moreover, in the above-described coating method according to the present invention, in the coating step, a part of the steel strip, which is upstream side from a position where the second roll applies the application liquid to the steel strip along a direction that the steel strip proceed, passes not below the second roll in a gravity direction, and a part of the steel strip separated from the third roll, which is downstream side along the direction that the steel strip proceeds, is inclined at an angle of −20° to 20° relative to a direction perpendicular to the gravity direction.

Moreover, in the above-described coating method according to the present invention, a proceeding speed of the steel strip is not less than 30 m/min.

Moreover, in the above-described coating method according to the present invention, the steel strip is a cold rolled steel strip for an electrical steel sheet.

Advantageous Effects of Invention

The coating device and the coating method of the present invention result in uniformly coating a coating material on a surface of a steel strip while improving productivity when coating the coating material using a roll in a predetermined pattern on the surface of the steel strip successively.

DESCRIPTION OF EMBODIMENTS

Figure 1:
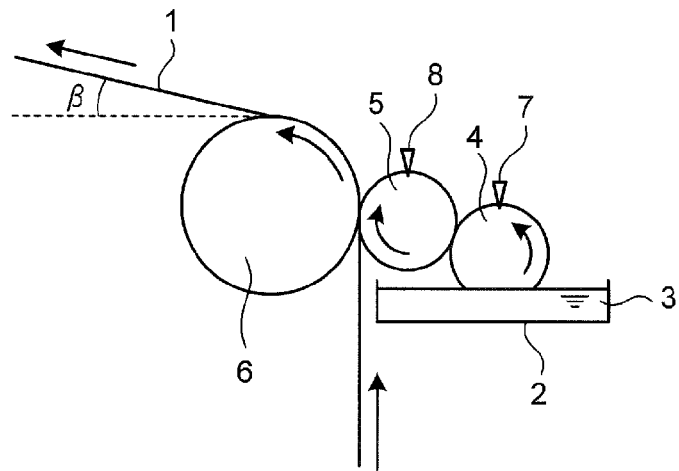
FIG. 1 is a schematic configuration diagram of a main configuration of a resist coating device according to a first embodiment of a present invention.

Preferred embodiments of a coating device and a coating method of the present invention are described below with reference to the accompanying drawings. Throughout all drawings, the same or corresponding element or component is denoted by like reference numerals. The embodiments are provided only as being illustrative and are not intended to limit the scope of the present invention.

First Embodiment

First of all, a coating device and a coating method according to a first embodiment of the present invention are described below. FIG. 1 shows a main configuration of a resist coating device as the coating device according to the first embodiment.

Resist Coating Device

As shown in FIG. 1, the resist coating device is a device that applies a coat of a resist ink to a steel strip 1. The resist coating device includes a pan dish 2 in which an application liquid 3 such as the resist ink or the like is reserved, a gravure roll 4, an offset roll 5, a backup roll 6, and blades 7 and 8.

The gravure roll 4 which is a first roll has a substantially cylindrical form and is rotatable about a central axis along a longitudinal direction of the substantially cylindrical form. In addition, the gravure roll 4 is configured such that a part of a side plane which consists of a curved surface of the substantially cylindrical form dips in the application liquid 3. The gravure roll 4 is configured such that the application liquid 3 can be scooped up from the pan dish 2 as a reservoir.

A side plane (i.e., a roll plane) that consists of the curved surface of the cylindrically formed gravure roll 4 has a plurality of cells (recesses). The cells formed on the side plane are arranged in a manner based on a linear groove pattern that is transformed to the steel strip 1 as described below. Specifically, the cells formed on the curved side surface of the gravure roll 4 are arranged such that the linear groove pattern is formed in a grid-like or a linear manner upon the linear groove pattern being transferred to the surface of the steel strip 1.

The offset roll 5 which is a second roll is formed of a rubber roll in which an elastic material such as rubber or the like is lined to for example a cylindrical steel roll with a lining thickness of 5 mm to 40 mm, for example. A rubber hardness (Hs: Shore hardness) is selected to be 40 Hs to 95 Hs, for example. A rubber with the rubber hardness of less than 40 Hs comes flexible to causing a large deformation. Thereby, a linear groove by means of the application liquid 3 is collapsed. As a result, defects of the linear groove in the linear groove pattern to be transformed to the steel strip 1 are likely to occur. On the other hand, a rubber with the rubber hardness of more than 95 Hs comes impossible to follow deformation of the steel strip 1. Therefore, unevenness of coating of the application liquid 3 is likely to occur. In light of the foregoing, the offset roll 5 is configured by lining an elastic material such as a rubber with appropriate hardness so as to follow deformation of the steel strip 1 as well as to prevent a surface of the steel strip 1 from any defects.

The offset roll 5 is formed rotatable about a central axis along a longitudinal direction of the cylindrical form, as well as a part of the curved surface of the cylindrical form contacts with a part of a curved surface of the gravure roll 4, which is not soaked in the application liquid 3. At the contact portion, a linear pattern made of the application liquid 3 is transferred from the gravure roll 4 to the offset roll 5. The offset roll 5 transfers, to the surface of the steel strip 1, the linear pattern made of the application liquid 3 that has been transferred from the gravure roll 4.

Furthermore, in the first embodiment, the blade 7 which is first scratch off means consists of for example a metal or a resin such a rubber, and is located in vicinity of the roll surface of the gravure roll 4. The blade 7 uniformly scratches off an excessive application liquid 3 from the surface of the gravure roll 4. In the first embodiment, the blade 7 is located at uppermost part of the gravure roll 4 or within a range between the upstream side of the uppermost part along a direction of rotation of the gravure roll 4 and the upstream side of a position where the gravure roll 4 contacts with the offset roll 5 (hereinafter, referred to as the first blade location range). Furthermore, the blade 7 is located at more downstream side along the direction of rotation of the gravure roll 4 than a position where the gravure roll 4 soaks in the application liquid 3 reserved in the pan dish 2. In a case where the blade 7 is located at a position outside of the first blade location range which is more downstream side than the uppermost part of the gravure roll 4, excessive application liquid 3 from an accumulated application liquid by the blade 7 may flow down through a flat side plane of the gravure roll 4 and a flat side plane of the offset roll 5 successively and deposit to the surface of the steel strip 1. If the excessive application liquid 3 deposits to the surface of the steel strip 1, it is hard to make a linear groove pattern to be transformed to the surface of the steel strip 1 in a uniform manner. As a result, forming a linear groove pattern on the surface of the steel strip 1 is interfered.

Furthermore, the blade 8 which is second scratch off means consists of for example a metal or a resin such a rubber, and is located in vicinity of the roll surface of the offset roll 5. The blade 8 scratches off an excessive application liquid 3 that is remained after transformed from the surface of the offset roll 5 to the surface of the steel strip 1. In the first embodiment, the blade 8 is located at uppermost part of the offset roll 5 or within a range between the downstream side of the uppermost part along a direction of rotation of the offset roll 5 and the upstream side of a position where the offset roll 5 contacts with the gravure roll 4 (hereinafter, referred to as the second blade location range). In a case where the blade 8 is located at a position outside of the second blade location range which is more upstream side than the uppermost part of the offset roll 5, an accumulated application liquid by the blade 8 is formed at more upstream side along a rotation direction of the offset roll 5 than a position where the blade 8 is located. In this case, an accumulated application liquid by the blade 8 may flow down through a roll plane and a flat side plane of the offset roll 5 and thus the application liquid 3 may deposit to a surface of the steel strip 1. If such the application liquid 3 deposits to the surface of the steel strip 1, it is hard to make the linear groove pattern to be transformed to the surface of the steel strip 1 in a uniform manner. As a result, forming the linear groove pattern on the surface of the steel strip 1 is interfered.

The backup roll 6 which is a third roll has for example a cylindrical form, and is configured such that a part of a curved side surface of the backup roll 6 (roll surface) contacts with the steel strip 1, namely the steel strip 1 winds around the backup roll 6. The backup roll 6 around which the steel strip 1 partially winds cooperates with the offset roll 5 to pinch the steel strip 1, as well as to transfer and coat the application liquid 3 to the steel strip 1 by the offset roll 5.

According to the configuration mentioned above, a rotation direction relationship among the gravure roll 4, the offset roll 5, and the backup roll 6 is as follows. The gravure roll 4 and the offset roll 5 each rotate in the opposite direction. The offset roll 5 and the backup roll 6 each rotate in the opposite direction. At a position where the offset roll 5 and the backup roll 6 are contact with each other, the both rotate in the same direction.

The resist coating device is configured such that the steel strip 1 is not positioned at the offset roll 5 side position nearer than the position where the offset roll 5 coats the application liquid 3 in the linear groove pattern at the upstream side of the position where the offset roll 5 applies the application liquid 3 to the steel strip 1. In the resist coating device configured in this way, the backup roll 6 causes the steel strip 1 to pass through such that the steel strip 1 is not laid under the offset roll 5 in the gravity direction. Namely, a part of the steel strip 1 which is an upstream side along a direction that the steel strip 1 proceeds from a coating position of the application liquid 3 passes not below the offset roll 5 in the gravity direction. When the steel strip 1 passes below the offset roll 5 in the gravity direction, i.e., when the steel strip 1 passes a side of the offset roll 5 along a horizontal direction relative to the coating position of the application liquid 3, if the application liquid 3 that flows down through the surface of the offset roll 5 or passes through the blade 8 drops, the droplet of the application liquid 3 deposits to the surface of the steel strip 1. In this case, consequently, defect of coating of the linear groove pattern occurs at the surface of the steel strip 1. As a result, it is hard to make the linear groove pattern on the surface of the steel strip 1 in a uniform manner.

Furthermore, in the resist coating device, a part of the steel strip 1, which does not wind around the backup roll 6 and is downstream side from the coating position of the application liquid 3 where the steel strip 1 contacts with the offset roll 5, proceeds in a direction that is inclined at an inclined angle β (°) relative to a horizontal direction perpendicular to the gravity direction. Assuming a upper side with respect to the horizontal direction is positive, the inclined angle β (°) is preferably from −20° to 20° (i.e., $-20°≤β≤20°$), more preferably from −10° to 10° (i.e., $-10°≤β≤10°$). If the part of the steel strip 1, which does not wind around the backup roll 6 and is downstream side from the coating position of the application liquid 3, proceeds in the direction that is less than −20° or more than 20°, the coated application liquid 3 flows by leveling effect. In this case, defects such as collapse and/or shortage of non-coated part in the linear groove pattern occur. As mentioned above, the resist coating device according to the first embodiment is configured.

A Method of Coating a Resist Ink

Figure 2:
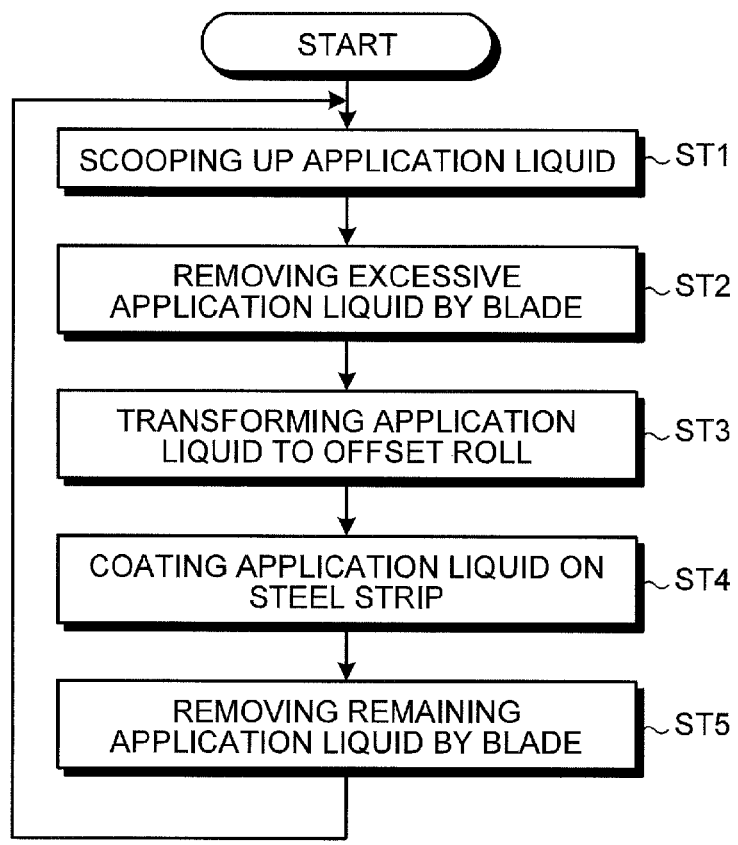
FIG. 2 is a flow chart illustrating a resist ink coating method according to a first embodiment of the present invention.

Next, a method of coating the resist ink using the resist coating device as mentioned above is described below. FIG. 2 is a flowchart illustrating the method of coating the resist ink according to the first embodiment of the present invention.

Namely, as shown in FIG. 2, in the method of coating the resist ink according to the first embodiment, scooping up the application liquid 3 is first performed (see step ST1 in FIG. 2). Specifically, as shown in FIG. 1, the application liquid 3 consisting of the resist ink is supplied to the pan dish 2 according to known method. Subsequently, the application liquid 3 in the pan dish 2 is scooped up by rotating the gravure roll 4.

Subsequently, removing by the blade 7 the excessive application liquid 3 deposited to the roll surface of the gravure roll 4 is performed (see step ST2 in FIG. 2). It allows the application liquid 3 on the roll surface of the gravure roll 4 to be uniform. The cells that are formed on the roll surface of the gravure roll 4 define the linear groove pattern.

Subsequently, transferring the linear groove pattern of the application liquid 3 on the surface of the gravure roll 4 to the offset roll 5 is performed (see step ST3 in FIG. 2). Subsequently, transferring the linear groove pattern that has been transferred from the gravure roll 4 to the surface of the steel strip 1 to coat the application liquid 3 is performed (see step ST4 in FIG. 2). Then, removing by the blade 8 the application liquid 3 that has been left on the roll surface of the offset roll 5 is performed (see step ST5 in FIG. 2).

Lastly, by repeating the above mentioned steps from ST1 to ST5, the linear groove pattern consisting of the resist ink can be formed over an entire surface of the steel strip 1 using the resist coating device according to the first embodiment (see FIG. 1).

Figure 3:
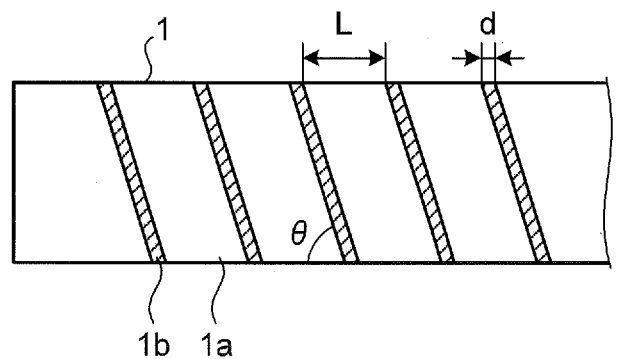
FIG. 3 is a schematic plane view illustrating an example of a linear groove pattern that is formed on a surface of the steel strip according to the first embodiment of the present invention.

FIG. 3 is a plane view of an example of the linear groove pattern that is transferred from the gravure roll 4 to the steel strip 1 via the offset roll 5. As shown in FIG. 3, a plurality of the cells that are formed on the roll surface of the gravure roll 4 are arranged such that the linear groove pattern comes linear for example upon transferred to the surface of the steel strip 1. The linear pattern is not limited to straight lines but may be curved lines. Furthermore, it is not limited to lines but may be a grid.

In the first embodiment, the linear groove pattern that is transferred to the surface of the steel strip 1 is, upon transferred, the linear pattern that extends in a width direction of the steel strip 1 with a predetermined angle θ inclined with respect to a direction of rolling of the steel strip 1 (i.e., the longitudinal direction). If the predetermined angle θ of the linear groove pattern comes less than 70° or more than 110° with respect to the rolling direction of the steel strip 1 (the longitudinal direction), it is impossible to obtain a sufficient effect of a magnetic domain refining in the steel strip 1 to be a grain oriented electrical steel sheet. Accordingly, the predetermined angle is preferably from 70° to 110° (i.e., $70°≤θ≤110°$).

As shown in FIG. 3, an applied part 1a of a linear groove pattern on a surface of the steel strip 1 is a region with a predetermined length L along a longitudinal direction of the steel strip 1. If the predetermined length L of the applied part 1a along the longitudinal direction of the steel strip 1 is less than 1 mm or more than 10 mm, it is impossible to obtain a sufficient effect of a magnetic domain refining in the steel strip 1. Accordingly, the predetermined length L of the applied part 1a is preferably from 1 mm to 10 mm (i.e., $1\ mm≤L≤10\ mm$).

A non-applied part 1b of the linear groove pattern on the surface of the steel strip 1 is a linear region with a predetermined width d (μm) along the longitudinal direction of the steel strip 1. If the predetermined width d of the non-applied part 1b is less than 10 μm, when the coated application liquid 3 is leveled, the application liquid 3 wetly spreads out as far as the non-applied part 1b to separate a linear groove form. On the other hand, if the predetermined width d of the non-applied part 1b is more than 500 μm, it is impossible to obtain a sufficient effect of a magnetic domain refining in the steel strip 1. Accordingly, the predetermined width d of the non-applied part 1b along the longitudinal direction is preferably from 10 μm to 500 μm (i.e., $10\ μm≤d≤500\ μm$).

Examples 1 to 6 and Comparative Examples 1 to 9

Next, examples 1 to 6 according to the first embodiment and comparative examples 1 to 9 are described for the purpose of making sure of remarkable effect of the examples 1 to 6.

With respect to the examples 1 to 6, experiment has been conducted using the resist coating device shown in FIG. 1. In the experiment, a steel strip 1 to be a cold rolling steel strip for an electrical steel sheet with 0.23 mm in thickness and 800 mm in width was used. A linear groove pattern was coated to the above mentioned steel strip 1 with various coating conditions to evaluate coating appearances after drying. The gravure roll 4 on which hard chrome casting with a plurality of the cells was applied has been used. The offset roll 5 was a rubber roll in which a rubber having rubber hardness of 80 Hs is lined with 20 mm in thickness of lining. The form of the groove of the gravure roll 4 was 100 μm in width of a non-applied part and 3 mm in width of an applied part along the rotation direction. Roll diameter of each of the gravure roll 4 and the offset roll 5 was 250 mm. The application liquid 3 mainly including alkydic resins diluted with ethylene glycol monobutyl ether with viscosity 1500 mPa·s at 20° C. was used as the resist ink. Furthermore, as shown in FIG. 1, the proceeding direction of the steel strip 1 was set with zero degree inclined, i.e., along the horizontal direction. The inclined degree relative to the horizontal direction was kept from −20° to 20° even if slack occurs in the steel strip 1. On the other hand, in the comparative examples 1 to 9, comparing to the coating conditions of examples 1 to 6, at least one of the positions of the blades 7 and 8 is changed from the positions of those according to the first embodiment.

Table 1 shows the coating conditions and results of the examples 1 to 6 and the comparative examples 1 to 9. Here, the electrolytic etching process was performed using the linear groove pattern as a mask in electrolytic solution of sodium chloride with current density being 10 A/dm² during 30 seconds. For a piece of the steel strip 1 that was cut off after drying, appearance evaluation after coating of the linear groove pattern was conducted with naked eyes and a microscope. In the appearance evaluation, "⊚" (very good) denotes that a uniform linear groove was found, "○" (good) denotes that fairly distortion was found in the linear groove, "x" (bad) denotes that disconnection was found in the linear groove. Furthermore, $W_{17/50}$ denotes that iron loss value when the maximum magnetic flux density has reached 1.7 T by exciting at frequency 50 Hz with a magnetic measurement device. $B_8$ denotes magnetic flux density when setting magnetizing force as 800 A/m.

TABLE 1

|  | Position of blade for the offset roll | Position of blade for the gravure roll | Line speed [m/min] | Appearance | $W_{17/50}$ [W/kg] | $B_8$ [T] |
| --- | --- | --- | --- | --- | --- | --- |
| Example 1 | Uppermost part | Uppermost part | 20 | ⊚ | 0.71 | 1.93 |
| Example 2 | Uppermost part | Uppermost part | 60 | ○ | 0.74 | 1.94 |
| Example 3 | Uppermost part | Uppermost part | 100 | ○ | 0.75 | 1.93 |
| Example 4 | Downstream side along a rotation direction | Upstream side along a rotation direction | 20 | ⊚ | 0.70 | 1.93 |
| Example 5 | Downstream side along a rotation direction | Upstream side along a rotation direction | 60 | ⊚ | 0.71 | 1.93 |
| Example 6 | Downstream side along a rotation direction | Upstream side along a rotation direction | 100 | ⊚ | 0.72 | 1.93 |
| Comparative Example 1 | Upstream side along a rotation direction | Upstream side along a rotation direction | 20 | ○ | 0.74 | 1.94 |
| Comparative Example 2 | Upstream side along a rotation direction | Upstream side along a rotation direction | 30 | X | 0.85 | 1.95 |
| Comparative Example 3 | Upstream side along a rotation direction | Upstream side along a rotation direction | 40 | X | 0.84 | 1.95 |
| Comparative Example 4 | Downstream side along a rotation direction | Downstream side along a rotation direction | 20 | ○ | 0.73 | 1.93 |
| Comparative Example 5 | Downstream side along a rotation direction | Downstream side along a rotation direction | 30 | X | 0.80 | 1.95 |
| Comparative Example 6 | Downstream side along a rotation direction | Downstream side along a rotation direction | 40 | X | 0.81 | 1.95 |
| Comparative Example 7 | Upstream side along a rotation direction | Downstream side along a rotation direction | 20 | ○ | 0.74 | 1.94 |
| Comparative Example 8 | Upstream side along a rotation direction | Downstream side along a rotation direction | 30 | X | 0.82 | 1.95 |
| Comparative Example 9 | Upstream side along a rotation direction | Downstream side along a rotation direction | 40 | X | 0.85 | 1.95 |

From Table 1, the examples 1 to 6, in which the blades 7 and 8 are located within the first blade location range and the second blade location range, respectively, show either "⊚" or "○" as appearance. To the contrary, the comparative examples 1 to 9 in which blades are located other than these location ranges show either "○" or "x" as appearance. In other words, when the blades 7 and 8 are not located within the first blade location range and the second blade location range, respectively, it is understood that a form of the linear groove pattern that is transformed to the surface of the steel strip 1 will be bad.

Furthermore, from Table 1, when a line speed of the steel strip 1 of each of the examples 1 to 6 is set at a speed which is higher than that of each of the comparative examples 1 to 9, specifically at a speed of 20 m/min or more, 30 m/min or more, and even 40 m/min or more, it is possible to form the linear pattern with a very good quality. Namely, it is understood that the examples 1 to 6 according to the first embodiment can accomplish coating of the resist ink using the offset roll 5 capable of transferring the linear groove pattern of the resist ink to the surface of the steel strip 1 in a fast and uniform manner. On the other hand, from Table 1, it is understood that the comparative examples 1 to 9 cause the form of the linear groove pattern that is transferred to the surface of the steel strip 1 to be bad. Furthermore, from Table 1, if it is desired to make the form of the linear groove pattern to the extent that fairly distortion occurs ("○"), the productivity reduces because it is necessary to decrease the line speed of the steel strip 1.

Examples 7 to 10 and Comparative Examples 10 to 13

Next, examples 7 to 10 according to the first embodiment and comparative examples 10 to 13 are described for the purpose of making sure of remarkable effect of the examples 7 to 10.

With respect to the examples 7 to 10, an experiment has been conducted using the resist coating device shown in FIG. 1. The gravure roll 4 of the resist coating device with 50 mm in roll diameter and 100 mm in length along the longitudinal direction (plane length) was employed. In the experiment, the steel strip 1 with 0.23 mm in thickness and cut into a piece of 300 mm×250 mm was used. Surfaces of the steel strips 1 were coated with the resist ink on inclined stages and were left for three seconds in the inclined state, and thereafter appearances of the dried coatings were evaluated. The form of the groove of the gravure roll 4 was 100 μm in width of a non-applied part and 3 mm in width of an applied part along the rotation direction.

Table 2 shows the coating conditions and results of the examples 7 to 10 and the comparative examples 10 to 13. Here, the electrolytic etching process was performed using the linear groove pattern as a mask in electrolytic solution of sodium chloride with current density being 10 A/dm$^2$ during 30 seconds. For a piece of the steel strip 1 that was cut off after drying, appearance evaluation after coating of the linear groove pattern was conducted with naked eyes and a microscope. In the appearance evaluation, "⊚" (very good) denotes that a uniform linear groove was found, "○" (good) denotes that fairly distortion was found in a linear groove, "x" (bad) denotes that disconnection was found in the linear groove.

TABLE 2

| | Inclined angle | Appearance | $W_{17/50}$ [W/kg] | $B_8$ [T] |
|---|---|---|---|---|
| Example 7 | 5° | ⊚ | 0.71 | 1.93 |
| Example 8 | 10° | ○ | 0.73 | 1.93 |
| Example 9 | 15° | ○ | 0.73 | 1.93 |
| Example 10 | 20° | ○ | 0.74 | 1.94 |
| Comparative Example 10 | 25° | X | 0.81 | 1.95 |
| Comparative Example 11 | 30° | X | 0.81 | 1.95 |
| Comparative Example 12 | 35° | X | 0.85 | 1.95 |
| Comparative Example 13 | 40° | X | 0.87 | 1.95 |

From table 2, when an inclined angle of the steel strip 1 is more than 20° or not less than 25°, appearance becomes bad. In this respect, it is understood that if a part of the steel strip 1, which is downstream side from the coating position of the application liquid 3, proceeds in the direction that is less than −20° or more than 20°, the linear groove pattern is not formed in uniform manner and thus it is hard to form a uniform groove onto the steel strip 1.

As described above, the first embodiment of the present invention allows for the uniform linear groove pattern that is transferred to the surface of the steel strip 1 while improving productivity, when coating the application liquid 3 such as the resist ink in a predetermined pattern on the surface of the steel strip successively.

Second Embodiment

Figure 4:
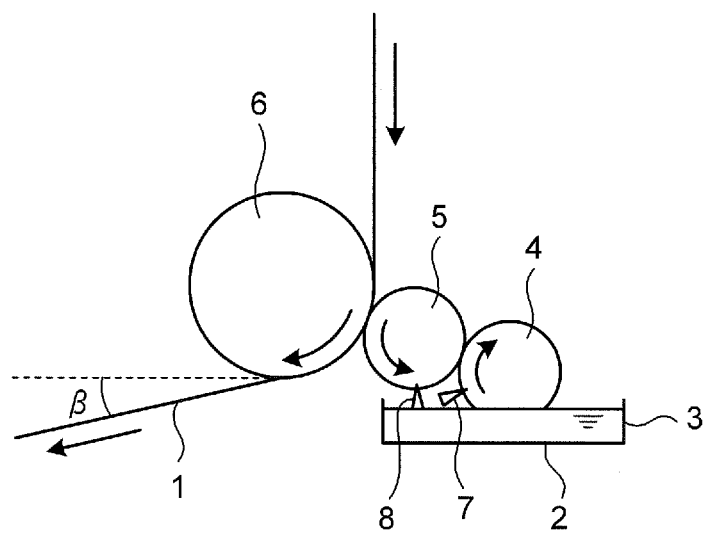
FIG. 4 is a schematic configuration diagram of a main configuration of a resist coating device according to a second embodiment of a present invention.

Next, a second embodiment of the present invention is described below. FIG. 4 shows a configuration of a resist coating device according to the second embodiment.

As shown in FIG. 4, the resist coating device according to the second embodiment, differing from the first embodiment, a part of the steel strip 1, which is upstream side from a coating position of the application liquid 3, proceeds in a vertically downward direction. In this respect of difference of direction between the first embodiment and the second embodiment, the gravure roll 4, the offset roll 5, and the backup roll 6 rotates in the opposite direction.

The blade 7 that scratches off the excessive application liquid 3 on the roll surface of the gravure roll 4 is located at a position upstream side along a rotation direction of the gravure roll 4 from a position where the gravure roll 4 contacts with the offset roll 5, and downstream side from a position where the gravure roll 4 soaks in the application liquid 3. The blade 8 that scratches off the excessive application liquid 3 on the roll surface of the offset roll 5 is located at a position downstream side from a position where the offset roll 5 contacts with a steel strip 1 to transfer the application liquid 3 to the steel strip 1, and upstream side along a rotation direction of the offset roll 5 from a position where the offset roll 5 contacts with the gravure roll 4. Explanations of effects and configurations of the blades 7 and 8 are omitted because they are similar to those of the first embodiment.

In the second embodiment, as a part of the steel strip 1, which is upstream side from the coating position of the application liquid 3, proceeds in the vertically downward direction, if the application liquid 3 drops off from the offset roll 5 and the like, it never deposits to the surface of the steel strip 1. Therefore, it is possible to prevent defects in the form of the linear groove pattern transformed to the surface of the steel strip 1.

While certain embodiments have been described, these embodiments have been presented by way of example only, and are not intended to limit the scope of the inventions. Indeed, the embodiments described herein may be embodied in a variety of other forms, substitutions and changes in the form of the embodiments described herein that may be made without departing from the spirit of the inventions. For instance, numerical values above described have been presented by way of example only, other numerical value may be available if necessary.

INDUSTRIAL APPLICABILITY

As described above, the coating device and the coating method of the present invention are useful for successively coating an application liquid on a surface of a steel strip, in particular, suitable for successively and uniformly coating the application liquid in a predetermined pattern on the surface of the steel strip while improving productivity.

REFERENCE SIGNS LIST 1 steel strip
1a applied part
1b non-applied part
2 pan dish
3 application liquid
4 gravure roll
5 offset roll
6 backup roll
7, 8 blade

The invention claimed is:

1. A coating device comprising:

a first roll including a roll surface on which an application liquid reserved in a pan dish is deposited;

a first scratch off member configured to scratch off the application liquid from the roll surface of the first roll;

a second roll including a roll surface configured to contact with the roll surface of the first roll, wherein the second roll is configured to rotate in a rotation direction opposite to a rotation direction of the first roll, the application liquid is transferred from the roll surface of the first roll to the roll surface of the second roll, and the second roll is configured to transfer the transferred application liquid to a steel strip;

a second scratch off member configured to scratch off the application liquid from the roll surface of the second roll; and a third roll configured to partially wind the steel strip, cooperate with the second roll to pinch the steel strip, and rotate in a rotation direction opposite to the rotation direction of the second roll, wherein the first roll is a gravure roll, the first scratch off member is located between a more upstream side than an uppermost part of the first roll along the rotation direction of the first roll and more upstream side than a position where the first roll contacts with the second roll along the rotation direction of the first roll, the second scratch off member is located between a more downstream side than an uppermost part of the second roll along the rotation direction of the second roll and more upstream side than a position where the second roll contacts with the first roll along the rotation direction of the second roll, and the first roll, the second roll and the third roll are arranged such that a part of the steel strip, which is upstream side from a position where the second roll applies the application liquid to the steel strip along a direction that the steel strip proceed, passes not below the second roll in a gravity direction.

2. The coating device according to claim 1, further comprising a controller configured to control a proceeding speed of the steel strip to be not slower than 30 m/min.

* * * * *